United States Patent

[11] 3,589,423

| [72] | Inventor | Joseph R. Metz |
| | | Ridgefield, Conn. |
| [21] | Appl. No. | 831,918 |
| [22] | Filed | June 10, 1969 |
| [45] | Patented | June 29, 1971 |
| [73] | Assignee | Norco, Inc. |
| | | Ridgefield, Conn. |

[54] LOCKING-TYPE MACHINE NUT
6 Claims, 13 Drawing Figs.

| [52] | U.S. Cl. | 151/14, 85/32 |
| [51] | Int. Cl. | F16b 37/12 |
| [50] | Field of Search | 151/14 CS, 14; 85/32 CS, 32, 36 |

[56] References Cited
UNITED STATES PATENTS

| 900,589 | 10/1908 | Ratcliffe | 151/14 CS |
| 1,502,555 | 7/1924 | Eklund | 151/14 CS |
| 1,630,958 | 5/1927 | Mauch | 151/14 CS |
| 2,515,220 | 7/1950 | Hattan | 151/14 CS |

FOREIGN PATENTS

| 511,347 | 10/1930 | Germany | 151/14 CS |

*Primary Examiner*—Edward C. Allen
*Attorney*—H. Gibner Lehmann

ABSTRACT: A nut comprising an unthreaded annular body in which a screw part is received, said body having a shoulder disposed in and intermediate the ends of the bore of the body. A helical coil spring is located in the bore, with one end portion abutting the shoulder. The spring has radial terminals passing through openings in the annular body, one terminal being capable of appreciable freedom of movement. A shell surrounds, and is turnably movable on the annular body, said shell having lost-motion connections with the spring terminals. The nut is screwed onto its cooperable screw part, which threads into the coil spring, slightly expanding the same to effect a friction grip. The outer shell can apply forces to either end of the coil spring, to accomplish the screwing-on or unscrewing of the nut.

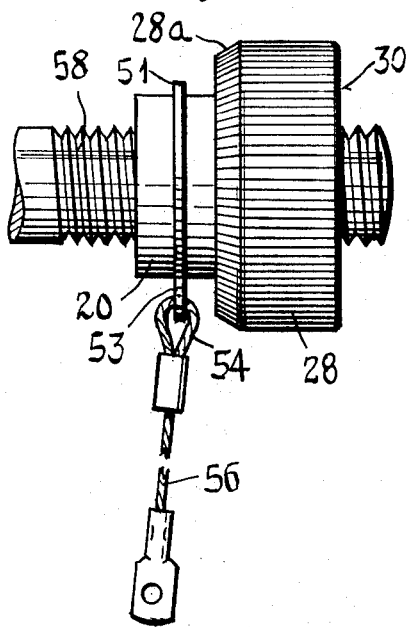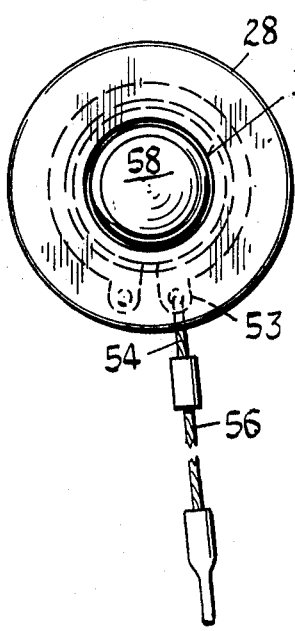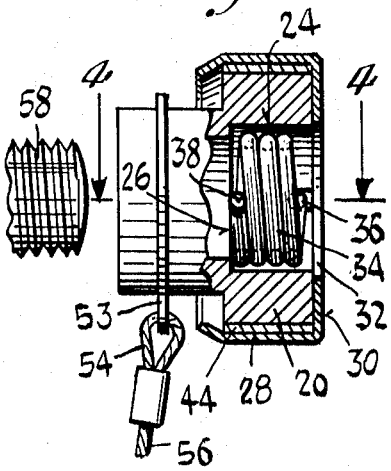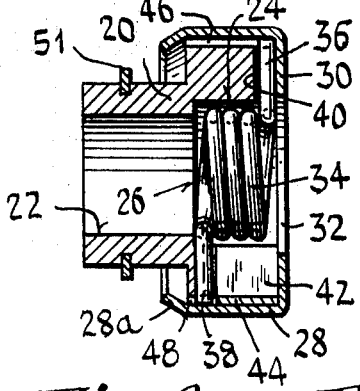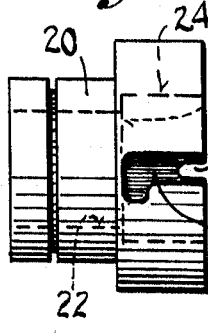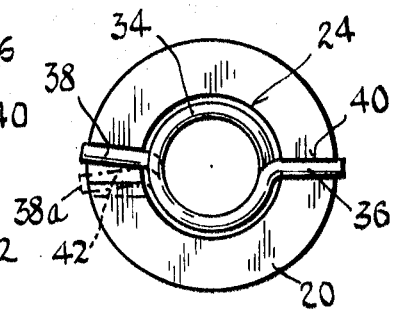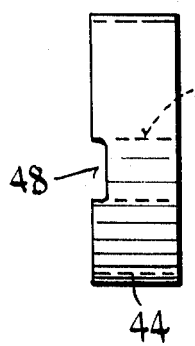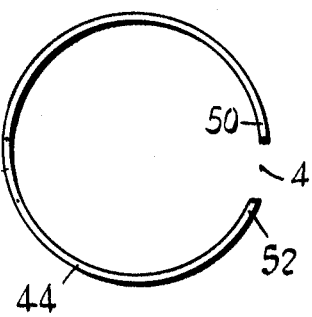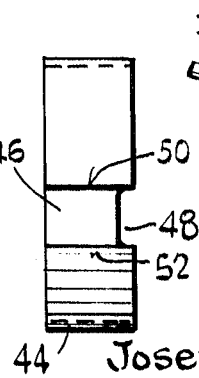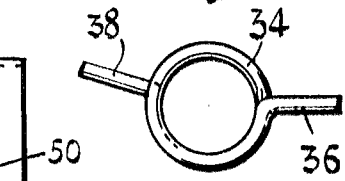
INVENTOR.
Joseph R. Metz INVENTOR.
Joseph R. Metz

LOCKING-TYPE MACHINE NUT

BACKGROUND

This invention relates to locking-type machine nuts, and more particularly to nuts of this character, wherein coil springs are utilized as the main holding threads of the nut.

Heretofore, machine nuts comprising annular bodies having cut or formed threads in their bores were provided with lock means in the form of coil springs which constituted auxiliary threads engageable with the screw part to effect the locking action. Other locking nuts employed plastic or similar bushings incorporated in the nut body and adapted to be impressed by the threads of the screw part. These prior devices either were difficult to screw on and unscrew, or else complicated and not convenient to operate during their application to and removal from the screw part.

SUMMARY

The foregoing drawbacks and disadvantages of prior locking-type nuts are obviated by the present invention, one object being the provision of an improved machine nut which normally tightly frictionally grips the cooperable screw part, yet which is especially easily operated to tighten or loosen it under substantially friction-free conditions. This is accomplished by utilizing a helical coil spring as the main, only thread means of the nut. The spring, normally a tight fit on the screw part to frictionally grip the same, is disposed in the bore of an annular nut body which is itself unthreaded and which turnably carries an outer shell connected with the spring ends to effect enlargement of the spring coils so that they release their grip for purposes of turning the nut to tighten or loosen the same.

Other objects of the invention include the provision of an improved nut as above set forth, wherein the turning of the nut and automatic reduction of friction are effected by merely applying the usual, well-understood turning forces to the nut exterior, wherein the nut when in place on the screw part resists turning, vibrational forces and the like to a marked degree even when it is not clamping a cooperable member yet instantly releases it grip when this is desired; and wherein a high degree of reliability is had as well as a special simplicity of construction, involving relatively few parts which can be easily and quickly assembled.

Still other features and advantages will hereinafter appear.

In the drawings, showing several embodiments of the invention:

FIG. 1 is a side elevational view of the present improved locking-type nut, applied to a screw part.

FIG. 2 is a back end elevational screw of the nut of FIG. 1, removed from the screw part.

FIG. 3 is an axial sectional view of the locking-type nut, revealing interior details.

FIG. 4 is an axial sectional view taken on the line 4—4 of FIG. 3.

FIG. 5 is a side elevational view of the annular body of the nut.

FIG. 6 is an end elevational view of the nut body of FIG. 5, having incorporated in it a helical spring element which is adapted to grip the screw part.

FIG. 7 is a plan or face view of the helical spring element of the nut.

FIG. 8 is an end or edge elevational view of a connector sleeve or ring element used in the nut of FIGS. 1—7.

FIG. 9 is a side elevational view of the connector sleeve, viewed from the left side when considering FIG. 8.

FIG. 10 is a side elevational view of the connector sleeve viewed from the right side when considering FIG. 8.

Figure 11:
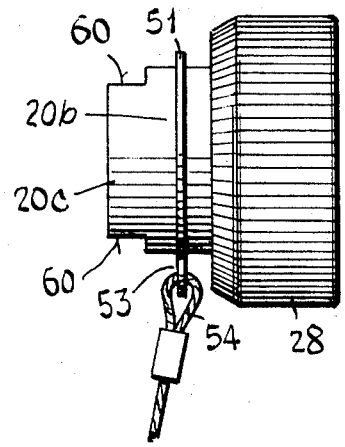
FIG. 11 is a side elevational view of a locking-type nut constituting another embodiment of the invention.

Considering first FIGS. 1—10, the nut shown therein comprises an annular body 20 having a stepped axial bore 22, 24 which includes an annular shoulder formation 26 disposed intermediate the ends of the bore. Surrounding and turnable on the body 20 is an operating shell 28 having the form of a cup, with a bottom wall 30 provided with a central aperture 32.

In accordance with the present invention, the annular body 20 of the nut may be devoid of cut or otherwise formed screw threads, and there is disposed in the large-diameter bore portion 24 thereof a helical coil spring 34 which at one end portion engages or abuts the shoulder 26 of the body. The spring 34 has out-turned, substantially radially extending ends or terminals 36, 38 which pass through clearance openings 40, 42 respectively in the annular body 20. The clearance opening 40 comprises a relatively shallow notch which closely slidably fits about the spring terminal 36, whereas the clearance opening 42 comprises preferably a bayonet slot which loosely receives the spring terminal 38 and enables the latter to have considerable freedom of circumferential movement from its normal position illustrated in FIGS. 6 and 7 in a counterclockwise direction tending to unwind or enlarge the coil convolutions. A position of the terminal 38 illustrating such freedom of movement and illustrating the partially uncoiled condition of the spring 34 is shown in broken outline in FIG. 6. For such condition, the spring terminal 38 will occupy the offset bottom portion of the bayonet slot 42, as seen in FIG. 6.

In accordance with the present invention, the operator shell 28 of the nut includes means providing driving connections between it and the spring ends or terminals whereby the shell can apply forces selectively to either terminal of the spring to accomplish the screwing-on or unscrewing of the nut, as will be shortly described. The said driving connections between the shell 28 and the spring terminals are such as to incorporate considerable lost motion whereby a predetermined, limited freedom of movement of the terminals is had with respect to the shell.

In the embodiment of the invention shown in FIGS. 1—10 the means which provides the driving connections comprises a connector sleeve or ring 44 which is rigidly secured to and disposed within the shell 28, said sleeve having cuts 46, 48 in which the spring ends or terminals 36, 38 are respectively disposed. The cut 46 is preferably a through-cut which forms a pair of juxtaposed ends 50, 52, whereas the cut 48 is in the form of a relatively shallow notch in the edge of the sleeve.

The distance between the juxtaposed ends 50, 52 of the sleeve 44 may be advantageously on the order of four times the diameter of the spring terminal 36, and the width of the notch 48 may also be advantageously approximately four times the diameter of the spring terminal 38. By such construction there is considerable lost motion built into the nut between the shell 28 and sleeve 44 on the one hand, and the spring terminals and annular nut body 20 on the other hand.

Any suitable means may be provided for securing the sleeve 44 rigidly to the shell 28, one method involving a few drops of a quick-drying adhesive applied during the assembly of the sleeve into the shell. The coil spring 34 may be readily assembled to the annular body 20 as illustrated in FIG. 6. Prior to assembly of the outer shell 28 to the nut body 20 and prior to insertion of the sleeve 44 in the shell, the latter has cylindrical sidewalls which are substantially straight, that is, without any inward crimping. Accordingly, the assembly of the sleeve 44 and securement of the same is easily effected, and thereafter the assemblage of sleeve 44 and shell 28 may be applied to the assembled body 20 and spring 34 in such a manner that the spring terminal 36 occupies the cut 46 with the spring terminal 38 occupying the cut 48. Thereafter, edge portions of the outer shell 28 may be crimped inward slightly so as to retain the shell in place without affecting the turnable movement of the shell and sleeve on the nut body 20. In FIGS. 1 and 4 the inwardly crimped edge of the shell 28 is designated 28 a.

The nut body 20 can be provided with an annular groove to accommodate a snap ring 51 having an apertured tab 53 for receiving the eye portion 54 of a cable tie 56 by which the nut may be held captive to the equipment while permitting it to have free turning movements.

The operation of the improved locking-type nut is as follows:

Considering FIGS. 3 and 4, when the nut is being applied to the screw part 58, the latter is first guided into the small diameter bore portion 22 and brought into engagement with the inner end convolution of the coil spring 34. The user thereupon applies a clockwise turning force to the operator shell 28. This turning force will be transmitted to the spring terminal 36, whereas the lead portion and terminal 38 of the spring will be relatively free or devoid of restraint. The lead portion of the spring 34 therefore can open up or enlarge slightly in diameter whereupon the spring will readily screw onto the screw part 58. In this manner the nut can be easily applied to the screw part. Upon removal of the clockwise turning force from the shell 28, the spring 34 will be permitted to coil more tightly so as to strongly, frictionally grip the screw part 58, thereby eliminating looseness between the threads and spring and maintaining the nut in its given position against loosening under the effects of vibration and the like. It will be noted that the convolutions of the coil 34 will tightly grip the threads of the screw part 58 regardless of whether or not the nut is pulled up tightly against a cooperable part. At the time that the nut is to be removed, the user merely applies a counterclockwise turning force to the shell 28. This force is transmitted to the spring terminal 38 there being no force acting on the spring terminal 36. In consequence, the spring 34 tends to open and release its grip upon the screw part 58, and the nut is thus easily unscrewed from the part 58 due to the gripping frictional forces having been considerably reduced. However, at such time that the counterclockwise turning force is removed from the shell 28, the spring will again be free to close in upon the screw part 58, thereby to tightly frictionally seize the same.

It will be understood from the foregoing that the nut may be easily screwed onto and unscrewed from the screw part, merely by applying the appropriate turning forces to the outer shell 28. In each instance, the appropriate terminals of the spring 34 are actuated in a manner to enlarge the spring convolutions and substantially reduce the frictional forces between the same and the screw part. I have found by actual test that a nut made in accordance with my invention surprisingly withstands considerable shock and vibrational forces without failure. Preferably the diameter of the large-bore portion 24 of the body 20 is only sufficiently greater than the outer diameter of the spring 34 to permit the desired enlargement of the spring for the easy screwing and unscrewing operations, and is not so large as to permit the spring to increase its diameter to an extent where it can be stripped from the threads of the screw part 58.

Another embodiment of the invention is illustrated in FIG. 11, wherein the construction and functioning of the nut is substantially the same as described above with the exception that the annular nut body 20b has a forwardly extended portion 20c provided with oppositely disposed flats 60 to accommodate a wrench. Since the nut body 20 (or 20b) is keyed to the spring terminal 36 without appreciable looseness, the screwing-on force may be applied directly to the nut body instead of through the intermediary of the operating shell 28 and connector sleeve 44. Thus, considering FIG. 11, a wrench may be utilized on the body portion 20c to tighten the nut on the screw part, if this should be desired. Otherwise, the operation of the embodiment of FIG. 11 is the same as that described above in connection with FIGS. 1—10. It will be understood however that for purposes of unscrewing the nut illustrated in FIG. 11 a counterclockwise turning force must be applied to the operator shell 28.

Figure 12:
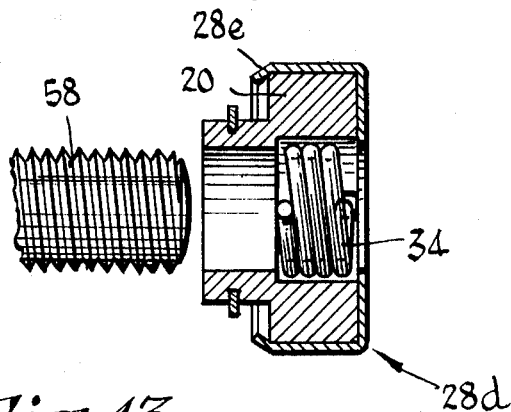
FIG. 12 is an axial sectional view of a locking-type nut constituting yet another embodiment of the invention, shown with a portion of a screw part.
Figure 13:
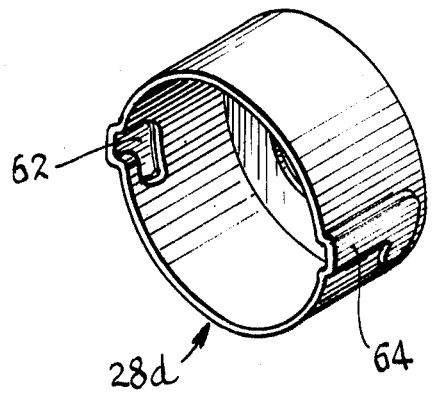
FIG. 13 is a perspective view of the outer, operating shell of the nut of FIG. 12.

Yet another embodiment of the invention is illustrated in FIGS. 12 and 13. In these figures, the annular nut body 20 carries the spring 34 in the manner described above. Surrounding the nut body 20 is an operator shell 28d having a generally cylindrical sidewall provided with substantially diametrically opposite bayonet slot configurations 62 and 64. The bayonet slot configuration 62 is relatively shallow and adapted to accommodate the spring terminal 38, whereas the bayonet slot configuration 64 is relatively deep and adapted to accommodate the spring terminal 36. The bayonet slot configurations 62, 64 are so arranged as to provide the necessary looseness or lost motion between the operator shell 28d and the spring terminals. Preferably, the bottoms of the bayonet slots 62, 64 which provide clearance for the spring terminals are a small multiple of the terminal diameters, as for example three or four times the latter. Portions of the edge of the shell 28d are crimped inward during the assembly of the shell to the nut body 20, as indicated at 28e. Aside from the above different shell construction, which provides the lost-motion driving connections directly to the spring terminals, the nut is the same as already described for FIGS. 1—10.

It will now be understood from the foregoing that I have provided a novel and improved locking-type nut construction wherein the main thread means comprises a helical coil spring carried in an annular nut body against an abutment shoulder therein, the terminal portions of such spring being actuated by an outer operator shell which is turnable with respect to the nut body in a manner to greatly reduce the frictional forces with which the spring normally engages the threads of the cooperable screw part. All looseness between the thread means of the nut and the screw part is eliminated by the tendency for the coil spring to resume its slightly smaller normal diameter whereby it continually frictionally hugs the threads of the screw part. The construction of the nut is seen to be especially simple, involving relatively few parts, and the operation is such as to facilitate the turning of the nut by the application of turning forces applied to the outer operator shell in the well understood manner usually employed for tightening or loosening nuts.

Variations and modifications are possible without departing from the spirit of the invention.

I claim:

1. A locking-type nut adapted to be threaded onto a screw, comprising in combination:
    a. an annular body having a shoulder formation disposed in its bore intermediate the ends thereof,
    b. an annular shell surrounding and turnable with respect to said body,
    c. a helical coil spring disposed in the bore of the body, said spring being engaged at one end portion with the shoulder of the body and having out-turned substantially radially extending ends,
    d. an annular cylindrical drive member surrounding and engaged with said body and disposed within and engaged with the shell, said drive member having clearance passages in the walls, presenting shoulders which are engageable with the spring ends and providing driving connections between it and the spring ends, one of said clearance passages extending from one end to the other end of the drive member to permit passage of one spring end during assembly,
    e. said driving connections incorporating lost motion between the drive member and the spring ends,
    f. said annular body having a pair of clearance openings in its walls, through which the spring ends extend, each clearance opening extending to one and the same end of the annular body and having a mouth portion at said end whereby the spring without disruptive distortion of the coils thereof can be inserted endwise into the body with the ends of the spring respectively occupying said clearance openings,
    g. at least one of said clearance openings permitting limited free movement of the spring end therein circumferentially of the annular body, and
    h. means on said shell, securing and locking the same to the drive member against relative turning.

2. A nut as in claim 1, wherein:

a. the nut body has means engageable with a wrench, for facilitating the turning thereof.

3. A nut as in claim 1 wherein:
a. one of the clearance passages of said drive member comprises a cut through the entire wall portion of the member at one location thereon, forming a pair of opposed and juxtaposed ends, said member having an end notch constituting the other of said clearance passages.

4. A nut as in claim 1, wherein:
a. said one clearance opening of the annular body comprises a bayonet slot.

5. A nut as in claim 4, wherein:
a. the other clearance opening of the annular body comprises a notch disposed substantially diametrically opposite said bayonet slot.

6. A nut as in claim 1, wherein:
a. the shell comprises a cup having lip portions which are crimped over said annular drive member and body.